United States Patent
Chen et al.

(10) Patent No.: US 9,891,957 B2
(45) Date of Patent: Feb. 13, 2018

(54) COLLABORATING WITH RESOURCES RESIDING IN MULTIPLE INFORMATION DEVICES

(75) Inventors: Li-Ju Chen, Taipei (TW); Cheng-Ta Lee, Taipei (TW); Kang Liang Liu, Taipei (TW); Rick M F Wu, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 818 days.

(21) Appl. No.: 13/534,250

(22) Filed: Jun. 27, 2012

(65) Prior Publication Data

US 2013/0007136 A1    Jan. 3, 2013

(30) Foreign Application Priority Data

Jun. 30, 2011  (TW) .............. 100123289 A

(51) Int. Cl.
G06F 15/16        (2006.01)
G06F 9/50         (2006.01)

(52) U.S. Cl.
CPC ................. G06F 9/5044 (2013.01)

(58) Field of Classification Search
CPC .................................................... G06F 9/5044
(Continued)

(56) References Cited

U.S. PATENT DOCUMENTS 5,949,776 A      9/1999  Mahany et al.
5,961,582 A *   10/1999  Gaines .............................. 718/1
(Continued)

FOREIGN PATENT DOCUMENTS

CN        1598765 A      3/2005
CN      101197724 A      6/2008
(Continued)

OTHER PUBLICATIONS

How to: Add a Camera to the iPad, [online], [http://cnettv.cnet.com/add-camera-ipad/9742-1_53-50086026.html] (2012).
(Continued)

*Primary Examiner* — Kevin Bates
*Assistant Examiner* — Ronak Patel
(74) *Attorney, Agent, or Firm* — Cantor Colburn LLP

(57) ABSTRACT

An appliance, user information device, method, and computer program product for collaborating with resources residing in multiple information devices. The user information device may communicate with the appliance, and the appliance may further communicate with a first assisting device, wherein the first assisting device has access to a first resource capable of performing a first operation. The user information device includes a device communication interface, a processor configured to execute at least one application, the at least one application configured to generate a first command associated with the first operation via the processor, and a resource agent program executable by the processor, the resource agent program configured to send the first command to the appliance via the device communication interface, the first command operable for enabling performance of the first operation using the first resource when the appliance sends the first command to the first assisting device.

20 Claims, 8 Drawing Sheets

(58) Field of Classification Search
USPC .......................................................... 709/205
See application file for complete search history.

(56) References Cited

U.S. PATENT DOCUMENTS

| | | | |
|---|---|---|---|
| 6,993,398 B2 | 1/2006 | Li et al. | |
| 7,010,792 B1* | 3/2006 | Havemose | ................... 719/316 |
| 7,111,242 B1* | 9/2006 | Grooters | ................... G06F 8/38 |
| | | | 715/716 |
| 7,139,817 B1* | 11/2006 | English et al. | ............... 709/220 |
| 7,467,353 B2 | 12/2008 | Kurlander et al. | |
| 7,725,077 B2 | 5/2010 | Jung et al. | |
| 8,156,095 B2* | 4/2012 | Bigioi et al. | ................. 707/705 |
| 9,210,173 B2* | 12/2015 | Ferris | ................ G06F 21/6218 |
| 2002/0069276 A1* | 6/2002 | Hino | .................. H04L 12/2803 |
| | | | 709/223 |
| 2003/0038730 A1* | 2/2003 | Imafuku | ................ G08C 17/00 |
| | | | 340/4.3 |
| 2003/0041137 A1* | 2/2003 | Horie | .................. H04L 12/2803 |
| | | | 709/223 |
| 2005/0228887 A1 | 10/2005 | Wang et al. | |
| 2007/0016690 A1 | 1/2007 | Fishman et al. | |
| 2008/0031225 A1 | 2/2008 | Chavda et al. | |
| 2008/0080392 A1* | 4/2008 | Walsh | .............. H04L 29/12113 |
| | | | 370/254 |
| 2008/0215987 A1* | 9/2008 | Alexander | ............. G05B 15/02 |
| | | | 715/737 |
| 2008/0282172 A1 | 11/2008 | Bayang et al. | |
| 2009/0006660 A1 | 1/2009 | Bawcutt et al. | |
| 2009/0150553 A1* | 6/2009 | Collart | ............. G06F 17/30017 |
| | | | 709/229 |
| 2010/0022231 A1 | 1/2010 | Heins et al. | |
| 2010/0075714 A1 | 3/2010 | Keskar et al. | |
| 2010/0082784 A1* | 4/2010 | Rosenblatt | .......... H04L 12/2812 |
| | | | 709/222 |
| 2010/0241691 A1* | 9/2010 | Savitzky | ................. G06F 15/16 |
| | | | 709/203 |
| 2010/0253507 A1 | 10/2010 | Jung et al. | |
| 2012/0113459 A1* | 5/2012 | Williams | .............. G06F 3/1206 |
| | | | 358/1.15 |
| 2012/0209906 A1* | 8/2012 | Ausfeld | ................. H04L 51/36 |
| | | | 709/204 |
| 2012/0233644 A1* | 9/2012 | Rao | ..................... H04M 1/7253 |
| | | | 725/62 |

FOREIGN PATENT DOCUMENTS

| | | |
|---|---|---|
| CN | 101242331 A | 8/2008 |
| CN | 101826061 A | 9/2010 |

OTHER PUBLICATIONS

Duda, et al. "Architectures for Mobile Device Integration into Service-Oriented Architectures", Proceedings of the International Conference on Mobile Business, pp. 1-6, (2005).

Iglesia, et al. "Enhancing Mobile Learning Activities by the Use of Mobile Virtual Devices—Some design and Implementation Issues", International Conference on Intelligent Networking and Collaborative Systems, pp. 1-8 (2010).

Chinese Office Action for Chinese Application Serial No. 201210064134.0, dated Jul. 8, 2016; 7 pages.

* cited by examiner

COLLABORATING WITH RESOURCES RESIDING IN MULTIPLE INFORMATION DEVICES

PRIORITY

The present application claims priority to Taiwan Patent Application No. 100123289, filed on Jun. 30, 2011, and all the benefits accruing therefrom under 35 U.S.C. § 119, the contents of which in its entirety are herein incorporated by reference.

BACKGROUND

The present invention relates to resource collaboration. More specifically, the present invention relates to collaborating with resources residing in multiple information devices.

Currently, there is widespread use of information devices, such as mobile phones, personal computers, notebook computers, tablet computers, global positioning system (GPS) navigation devices, and digital cameras. These information devices operate in an independent manner rather than in an integrated manner. One technique intended to integrate such devices is described in an article, "Architectures for Mobile Device Integration into Service-Oriented Architectures" (short paper), ICMB 2005: 193-198, which discloses a method of integrating various information devices to form service-oriented architectures (SOA). Similarly, U.S. Pat. No. 7,467,353 describes a method of integrating a plurality of devices that results in a SOA.

In short, the known techniques are based on SOAs and are intended to integrate individual devices to form an application system, whereby each of the devices serves as an "element" of the application system and works according to services offered by the overall system.

BRIEF SUMMARY

According to exemplary embodiments, an appliance, a user information device, a method, and a computer program product for collaborating with resources residing in multiple information devices are provided. An embodiment of the appliance includes a communication interface configured to communicate with a user information device and a first assisting device. The first assisting device has access to a first resource capable of performing a first operation. The appliance also includes a router module configured to receive a first command associated with the first operation from the user information device via the communication interface. In response to a determination that the first assisting device has access to the first resource, the router module sends the first command to the first assisting device, thereby enabling performance of the first operation using the first resource.

An embodiment includes a user information device for communicating with an appliance. The appliance, in turn, communicates with a first assisting device. The first assisting device has access to a first resource capable of performing a first operation. An embodiment of the user information device includes a device communication interface and a processor configured to execute an application. The application is configured to generate a first command associated with the first operation via the processor. The user information device also includes a resource agent program executable by the processor. The resource agent application is configured to send the first command to the appliance via the device communication interface. The first command is operable for enabling performance of the first operation using the first resource when the appliance sends the first command to the first assisting device.

An embodiment of the method includes receiving, by a router module implemented by an appliance, a first command associated with a first operation. The first command is received from a user information device. In response to determining that a first assisting device has access to a first resource that is capable of performing the first operation, the method includes sending the first command to the first assisting device, thereby enabling performance of the first operation using the first resource.

An embodiment of the computer program product according to the method is also provided.

BRIEF DESCRIPTION OF THE SEVERAL VIEWS OF THE DRAWINGS

In order that the advantages of the embodiments will be readily understood, a more particular description will be rendered by reference to specific embodiments that are illustrated in the appended drawings. Understanding that these drawings depict only typical embodiments and are not therefore to be considered limiting of its scope, the embodiments will be described and explained with additional specificity and detail through the use of the accompanying drawings.

DETAILED DESCRIPTION

Referring now to FIG. 1 through FIG. 6, appliances, methods, and computer program products are illustrated as structural or functional block diagrams or process flowcharts according to various embodiments. The flowchart and block diagrams in the Figures illustrate the architecture, functionality, and operation of systems, methods and computer program products according to various embodiments. In this regard, each block in the flowcharts or block diagrams may represent a module, segment, or portion of code, which includes one or more executable instructions for implementing the specified logical function(s). It will be understood that, in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

Figure 1:
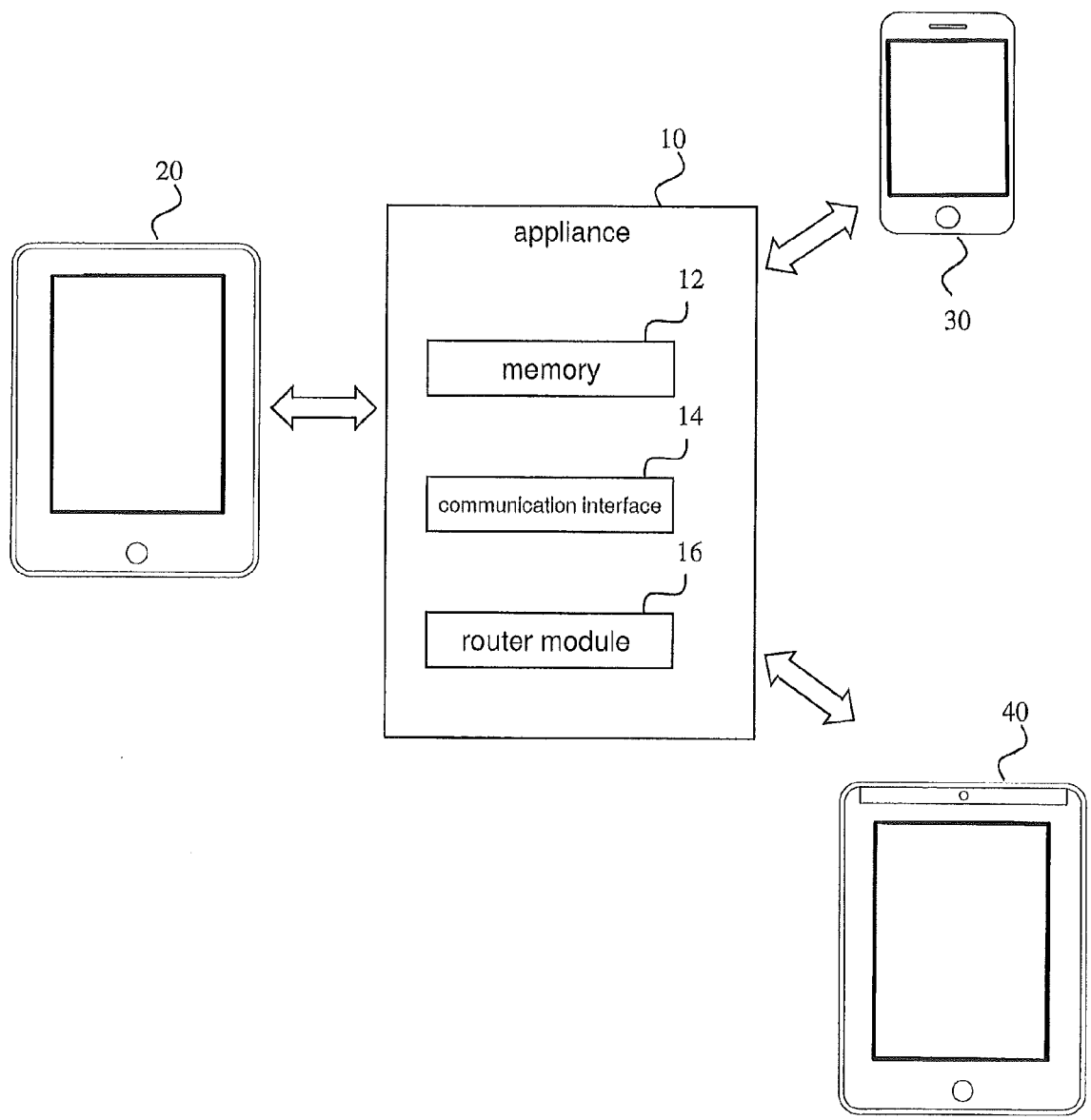
FIG. 1 is a diagram of an appliance in accordance with an embodiment.

Referring to FIG. 1, there is shown a block diagram of an appliance 10 according to an embodiment. In particular, the appliance 10 comprises a memory 12, a communication interface 14, and a router module 16. The appliance 10 may be designed according to a specific purpose or a specific service. The appliance may be configured for widespread use, e.g., a wireless network access point, a digital TV set-top box, or a network file sharing server, and is capable of performing a specific transaction according to a specific purpose. Examples of the appliance 10 may include, e.g., IBM® WebSphere® DataPower® SOA Appliance or IBM® Tivoli® ISS Appliance. (IBM, WebSphere, DataPower, and Tivoli are trademarks of International Business Machine Corporation, registered in many jurisdictions worldwide.)

The memory 12 may be a portable computer diskette, a hard disk drive, a random access memory (RAM), a read-only memory (ROM), an erasable programmable read-only memory (EPROM or flash memory), a portable compact disc read-only memory (CD-ROM), an optical storage device, or a magnetic storage device. The memory 12 stores firmware program code or data used in the operation of the appliance 10.

The appliance 10 communicates with information devices 20, 30, and 40 or other information devices (not shown) via the communication interface 14. The communication between the appliance 10 and the information devices 20, 30, and 40 may be effectuated by a wireless, wired, fiber-optic cable, or radio frequency (RF) means. In a non-limiting embodiment, the communication between the appliance 10 and the information devices 20, 30, and 40 is effectuated by a WLAN (Wireless Local Area Network), and thus may further include an additional WLAN router/access point. With a WLAN bridge itself being an appliance, it is feasible for the appliance 10 to function as the WLAN router/access point, or it is feasible that the appliance 10 undergoes a further extension and change based on the hardware architecture of a conventional WLAN bridge. However, it should be noted that the communication between the appliance 10 and the information devices 20, 30, and 40 need not utilize the same protocol. To the contrary, in one embodiment, for example, the appliance 10 may communicate with the information device 20 through a WLAN, with the information device 30 through Bluetooth, and with the information device 40 through a 3G mobile phone network.

The router module 16 routes a specific command from the information devices 20, 30, and 40 and a response resulting from an operation performed with respect to a targeted device, as will be described further herein. The router module 16 may be a hardware module, a software module, or a combination thereof, but the embodiments are not limited thereto.

In the example illustrated with FIG. 1, a user of the information device 20 communicates with the appliance 10 to gain access to resources related to the information devices 30, and 40. This phenomenon is referred to herein as "collaboration."

The "resources" described herein may include a hardware resource, a software resource, or a combination thereof required for an information device to execute one or more application programs in order to perform a specific operation. The resources of one device may vary from those of another device. For instance, the "resources" described herein can be illustrated with products of Apple Incorporated, such as the iPhone, iPod Touch, and iPad, some of which include resources related to photography, positioning navigation, and 3G mobile phone network connections. (Apple, iPhone, iPod Touch, iPad and iOS are trademarks of Apple Incorporated, registered in many jurisdictions worldwide.) Furthermore, the "resources" described herein can be illustrated with HTC Corporation products, such as the HTC Flyer, which have access to resources related to processing Flash webpages, Flash being a multimedia platform from Adobe. (HTC Flyer is a trademark of HTC Corporation, registered in many jurisdictions worldwide. Adobe and Flash are either registered trademarks or trademarks of Adobe Systems Incorporated in the United States, and/or other countries). Also, since the resources required for performing a specific operation are seldom restricted to a single element, the embodiments described herein do not enumerate all of the items of the resources for the sake of brevity; instead, the resources are generally referred to as "specific operation related resources," that is, attributing the resources to a specific operation, such as the aforementioned "photographic resources," "3G mobile phone network connection related resources," and "processing Flash webpage related resources." However, persons skilled in the art are able to identify easily various software/hardware elements actually included in the resources in accordance with a "specific operation" corresponding thereto.

Returning to FIG. 1, for purposes of clarity, the information device 20 is hereinafter referred to as a "user information device," and the information devices 30 and 40 are hereinafter referred to as "assisting devices." It will be understood, however, in other embodiments the information devices 20, 30, and 40 may be interchangeable in terms of their roles as "user information devices" and "assisting devices." For example, if the user of the information device 40 utilizes the resources of the information device 20 through the appliance 10, the information device 40 may be referred to as a "user information device," and the information device 20 may be referred to as an "assisting device."

In the embodiment illustrated with FIG. 1, the user information device 20, the assisting device 30, and the assisting device 40 may be implemented by an aforementioned Apple or HTC products, respectively. Furthermore, in another embodiment, the information devices 20, 30, and 40 may be implemented by conventional mobile phones, personal digital assistants (PDA), personal computers, notebook computers, tablet computers, digital cameras, digital albums, and positioning navigation devices.

Figure 2:
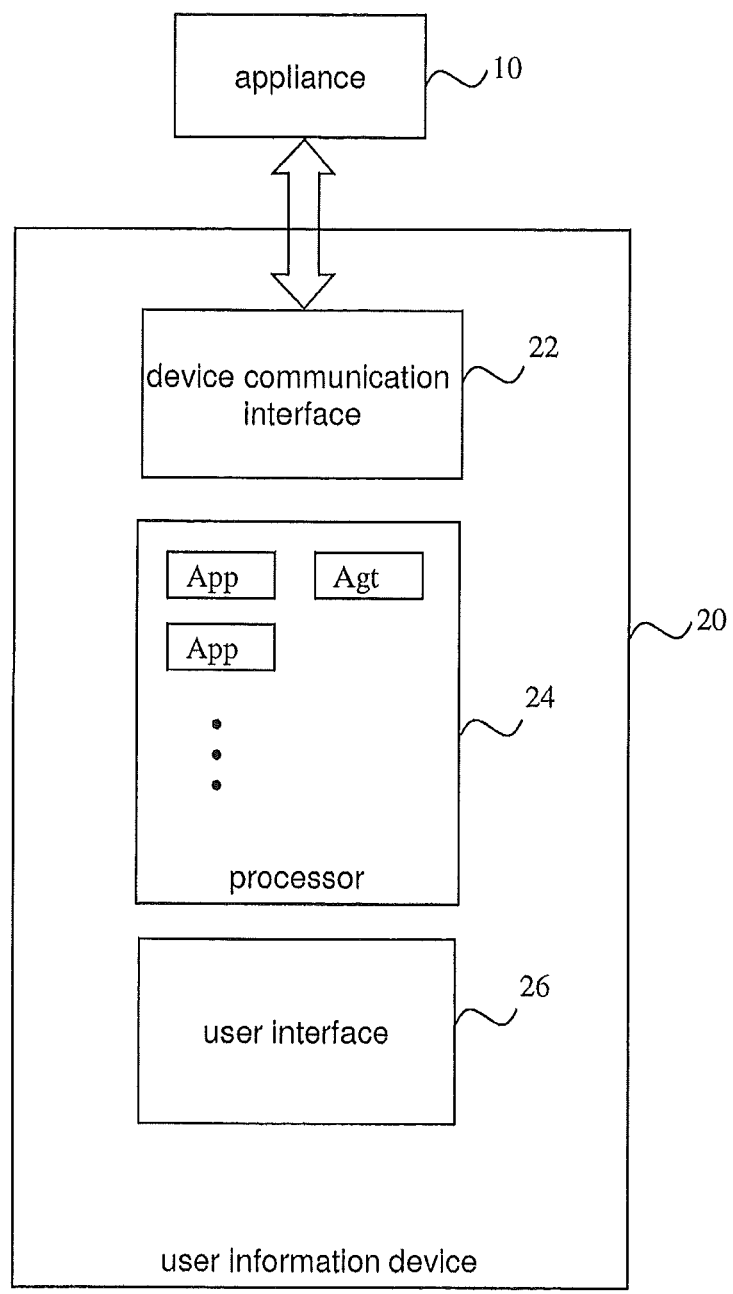
FIG. 2 is a diagram of a user information device in accordance with an embodiment.

Referring to FIG. 2, the user information device 20 includes a device communication interface 22, a processor 24, and a user interface 26. The device communication interface 22 is adapted to communicate with the appliance 10. The processor 24 executes basic operations, such as those implemented by an operating system of the user information device 20, and executes one or more application programs (illustrated in FIG. 2 as "App"). The device communication interface 22 of the user information device 20 may communicate with the appliance 10 using Wi-Fi or Bluetooth. In an embodiment, the processor 24 may include an Apple processor, which executes Apple's iOS operating system, as well as an application program (App) downloaded from an application store (e.g., App Store). The user interface 26 may be implemented by the iOS operating system operating in conjunction with a touchscreen (e.g., a touchscreen functioning as an input and display device). Related details of the above-mentioned are well-known among persons skilled in the art and thus are not described herein for the sake of brevity. The processor 24 is distinguishable from a processor of a conventional iPad in that the processor 24 further executes a resource agent program (illustrated in FIG. 2 as "Agt"). The resource agent program (Agt) operates in conjunction with the appliance 10, as will be described further herein. The resource agent program (Agt) may be built in an operating system or may be installed by a user on the user information device 20; however, the embodiments are not limited thereto. In one embodiment, the information devices 20, 30, and 40 each includes its own respective resource agent program (Agt), and operates in conjunction with the appliance 10 in accordance with their aforementioned roles as "user information devices" and "assisting devices," which as indicated above, may be interchangeable.

In one exemplary embodiment, the user information device 20 has the same resources as an iPad (Wi-Fi version), the assisting device 30 has the same resources as an iPhone, and the assisting device 40 has the same resources as an HTC Flyer. Hence, although the user information device 20 lacks photographic resources, 3G mobile phone network connection related resources, and processing Flash webpage related resources, the user information device 20 not only gains access to photographic resources and 3G mobile phone network connection related resources available on the assisting device 30, but gains access to photographic resources and processing Flash webpage related resources available on the assisting device 40, all via the appliance 10.

Figure 3:
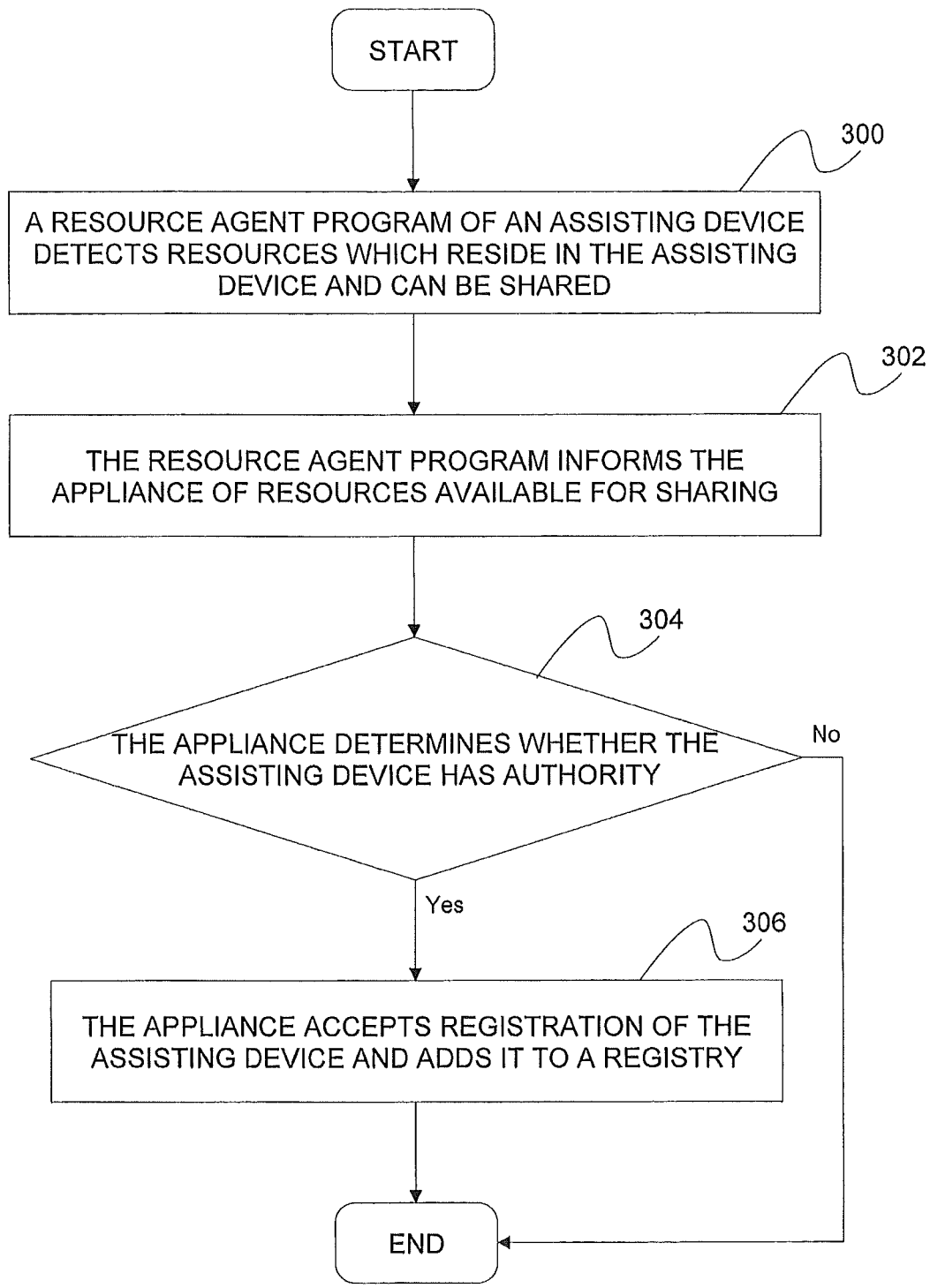
FIG. 3, FIG. 4A, FIG. 5A, and FIG. 6 are flowcharts of methods in accordance with embodiments.

Before the user information device 20 utilizes resources of the assisting device 30 or 40, the assisting device 30 or 40 registers with the appliance 10 any "shared" resources permitted by the assisting device 30 or 40. FIG. 3 is a flow chart describing a method in which the assisting device 30 registers its resources with the appliance 10. However, it will be understood that the method shown in FIG. 3 is also applicable to the assisting device 40 or another assisting device (not shown), or is applicable to a situation in which the information device 20 functions as an assisting device and attempts to gain access to resources available thereto.

At block 300, a resource agent program (Agt) of the assisting device 30 detects any resources residing in the assisting device 30 that can be shared, that is, photographic resources and 3G mobile phone network connection related resources.

At block 302, the resource agent program (Agt) of the assisting device 30 informs the appliance 10, by an entry message, of resources residing in the assisting device 30 that are available for sharing, as well as the characteristics of these resources. The entry message may be in Extensible Mark-Up Language (XML) format or other markup language formats.

At block 304, after receiving the entry message, the appliance 10 determines whether the assisting device 30 has authority (or undergoes other similar verifications), and rejects registration of the assisting device 30 when the determination is negative. However, this step may be omitted.

At block 306, if the appliance 10 determines that the assisting device 30 has authority or has passed verification, the appliance 10 accepts registration of the assisting device 30. In this embodiment, the appliance 10 maintains a registry for recording resources shared by the assisting device 30 (and the assisting device 40).

An example of the registry is shown in Table 1 below.

TABLE 1

| Channel/Resource ID | Resource Name | Resource Provider |
|---|---|---|
| 001 | photography | assisting device 30; assisting device 40 |
| 002 | 3G mobile phone network | assisting device 30 |
| 003 | processing Flash webpage | assisting device 40 |
| . . . | | |

An example of an entry message (in XML format) of the assisting device 30 is shown below. The message in tag <Device> serves to identify the assisting device 30, whereas the message in tag <Capability> describes each resource and the characteristics thereof.

```
<?xml version="1.0"?>
<DeviceRegistration xmlns="http://www.java2s.com"
    xmlns:xsi="http://www.w3.org/2001/XMLSchema-instance"
    xsi:schemaLocation="http://www.java2s.com Schema.xsd">
    <Device>
        <name>assisting device 30</name>
    </Device>
    <Capabilities>
        <Capability>
            <channel_id>001</channel_id>
            <name>photography</name>
            <pixel>5M</pixel>
        </Capability>
        <Capability>
            <channel_id>002</channel_id>
            <name>3G mobile phone network</name>
            <provider>T-Mobile</provider>
        </Capability>
        ...
    </Capabilities>
</DeviceRegistration>
```

Similarly, an example of an entry message (in XML format) of the assisting device 40 is as follows:

```
<?xml version="1.0"?>
<DeviceRegistration xmlns="http://www.java2s.com"
    xmlns:xsi="http://www.w3.org/2001/XMLSchema-instance"
    xsi:schemaLocation="http://www.java2s.com Schema.xsd">
    <Device>
        <name>assisting device 40</name>
    </Device>
    <Capabilities>
        <Capability>
            <channel_id>001</channel_id>
            <name>photography</name>
            <pixel>3M</pixel>
        </Capability>
        <Capability>
            <channel_id>003</channel_id>
            <name>processing Flash webpage</name>
            <version>10.2</version>
        </Capability>
        ...
    </Capabilities>
</DeviceRegistration>
```

Figure 4A:
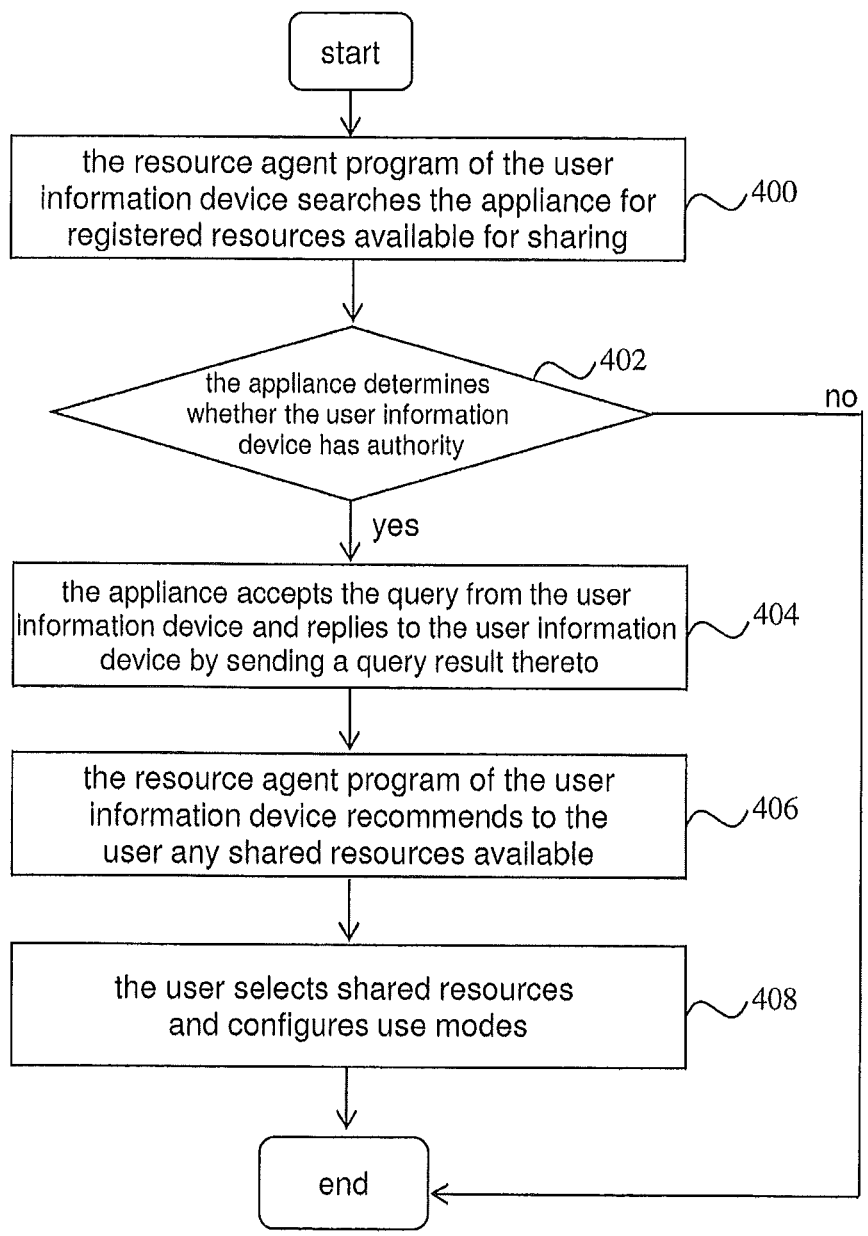

Upon completion of registration of resources shown in FIG. 3, the user information device 20 performs the procedure of "resources subscription" together with the appliance 10 in order to be informed in advance of resources that are accessible to the appliance 10 and are provided by another assisting device, and which can be provided to the user of the information device 20 as a reference during operation. FIG. 4A is a flow chart describing a method in which the user information device 20 performs resources subscription on the appliance 10. However, this process is not necessary to realize the advantages of the embodiments described herein.

At block 400, the resource agent program (Agt) of the user information device 20 searches the appliance 10 for registered resources available for sharing. The search may also carry a specified requirement condition, preferably a resource requirement condition for a specific application program (App) (such as "virtual photography" and "virtual Flash player"). Presented below is an example of a search message (in XML format) directed at a specific application program (App) and sent from the user information device 20 to the appliance 10. The message in tag <App> serves to identify a specific application program (App), whereas the message in tag <Requirements> describes the required resource and the characteristics thereof.

```
<?xml version="1.0"?>
<AppRegistration xmlns="http://www.java2s.com"
    xmlns:xsi="http://www.w3.org/2001/XMLSchema-instance"
    xsi:schemaLocation="http://www.java2s.com Schema.xsd">
        <App>
                <name>virtual photography</name>
        </App>
        <Requirements>
                <HardwareChannel>
                        <channel_id>001</channel_id>
                        <name>photography</name>
                        <pixel>5M</pixel>
                </HardwareChannel>
        <App>
                <name>virtual Flash player</name>
        </App>
        <Requirements>
                <HardwareChannel>
                        <channel_id>003</channel_id>
                        <name>processing Flash webpage</name>
                        <version>10.2</version>
                </HardwareChannel>
</AppRegistration >
```

At block 402, after receiving a query from the user information device 20, the appliance 10 determines whether the user information device 20 has authority (or undergoes other similar verifications), and may not reply to the query from the user information device 20 when the determination is negative. However, this step may be omitted.

At block 404, if the appliance 10 determines that the user information device 20 has authority or has passed verification, the appliance 10 accepts the query from the user information device 20. In an embodiment, the appliance 10 replies to the user information device 20 using the registry shown in Table 1; however, the appliance 10 may further create a resources checklist as shown in Table 2 according to the registry shown in Table 1. Compared with Table 1, the resources checklist of Table 2 does not show a resource provider (because the user information device 20 does not necessarily need to know this information).

TABLE 2

| Channel/Resource ID | Resource Name |
|---|---|
| 001 | photography |
| 002 | 3G mobile phone network |
| 003 | processing Flash webpage |
| ... | |

At block 406, after the user information device 20 has received the resources checklist returned by the appliance 10, the resource agent program (Agt) of the user information device 20 further recommends to the user, via the user interface 26, such as a menu, a diagram, or a list, any shared resources (such as photographic resources, 3G mobile phone network related resources, and processing Flash webpage related resources) available to the user information device 20.

In another embodiment, the resource agent program (Agt) of the user information device 20 sets a screening criterion automatically or through the user manually, and the user interface 26 recommends only those shared resources which meet the screening criterion. For example, if the screening criterion is "relevant to a network," the resource agent program (Agt) of the user information device 20 will recommend only 3G mobile phone network related resources to the user, even though the appliance 10 is capable of supplying photographic resources, 3G mobile phone network related resources, and processing Flash webpage related resources.

At block 408, the user interface 26 enables the user to configure multiple use modes. In each use mode, the user selects from all the shared resources available to the user information device 20 any shared resources required for the use mode; hence, in the use mode, the user interface 26 lists only those shared resources selected by the user rather than all the shared resources available to the user information device 20.

For instance, the user sets a "virtual iPhone" use mode. In this use mode, the user interface 26 provides a "virtual iPhone" use interface via a graphical user interface (GUI) in order to declare that "photographic resources" and "3G mobile phone network related resources" are available shared resources. Hence, although the user information device 20 has no direct access to "photographic resources" and "3G mobile phone network related resources," indeed, the user information device 20 is still able to perform any operation that requires "photographic resources" and "3G mobile phone network related resources," that is, "photography" and "3G mobile phone network connection."

Likewise, the user sets a "virtual HTC Flyer" use mode. In this use mode, the user interface 26 provides a "virtual HTC Flyer" use interface via a graphical user interface (GUI) in order to declare that "photographic resources" and "processing Flash webpage related resources" are available shared resources. Hence, although the user information device 20 has no direct access to "photographic resources" and "processing Flash webpage related resources," the user information device 20 is still able to perform any operation that requires "photographic resources" and "processing Flash webpage related resources," that is, "photography" and "processing Flash webpage."

Figure 4B:
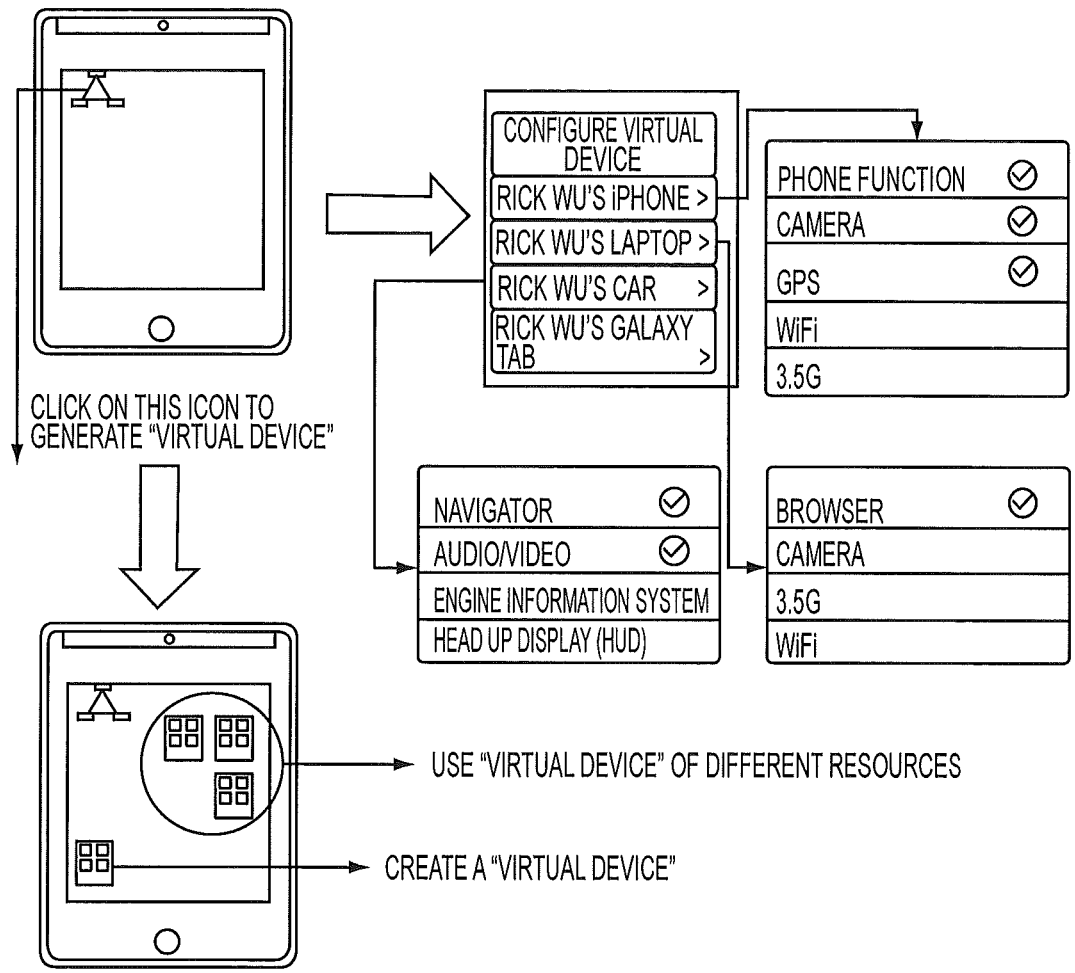
FIG. 4B is a diagram of graphical user interfaces (GUIs) in accordance with an embodiment.

FIG. 4B illustrates a graphical user interface (GUI) that provides multiple user modes in the user interface 26 of the user information device 20. As shown in FIG. 4B, the user may click on a specific icon to plan various "virtual devices" independently, wherein the particulars of available resources are displayed in a menu format or a list format on the interface of each "virtual device."

Figure 5A:
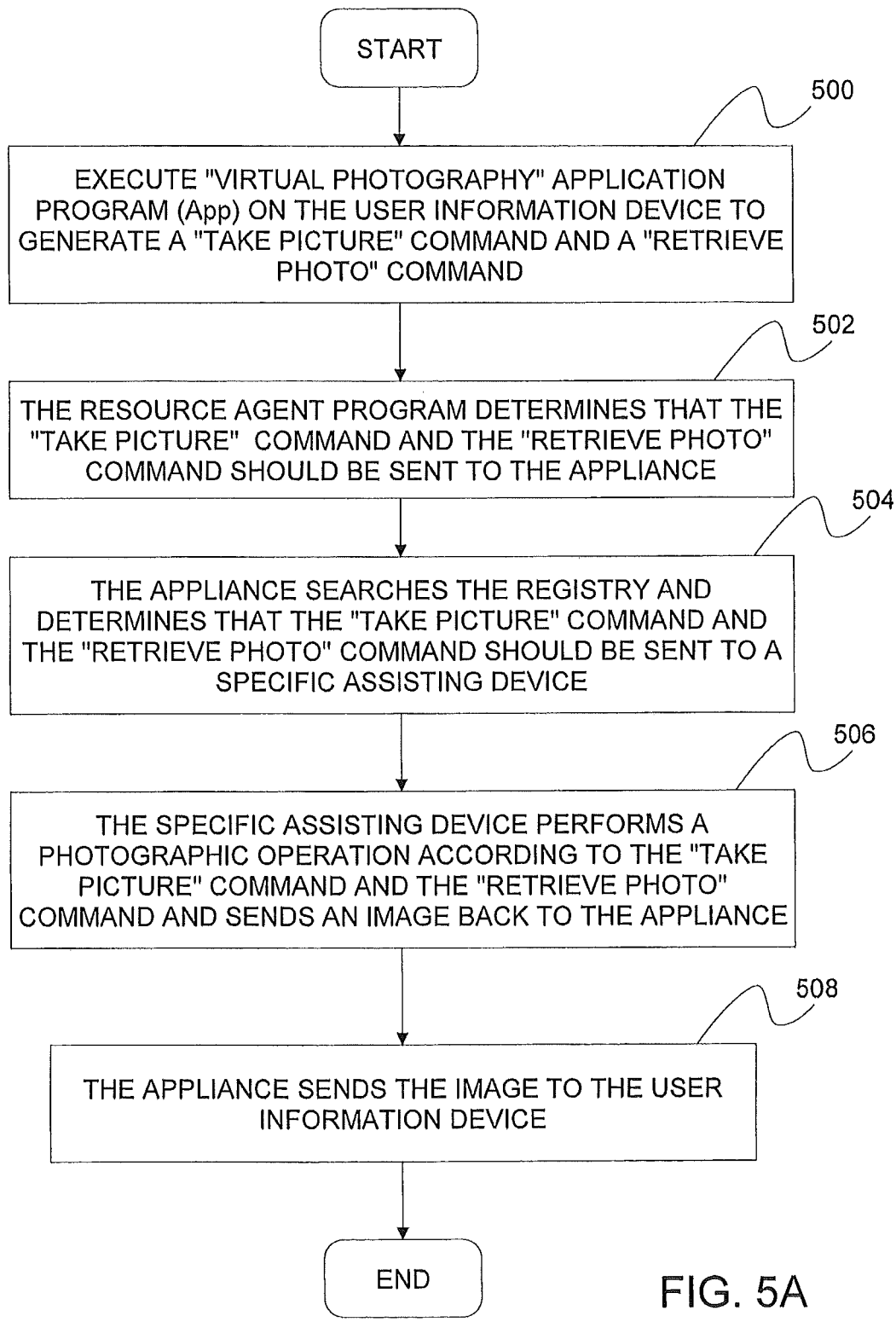

FIG. 5A is a flow chart of an embodiment, in which the user information device 20 utilizes the photographic resources of the assisting device 30.

At block 500, the user executes "virtual photography" application program (App) installed beforehand on the user information device 20, so as to perform a photographic operation. In response to the photographic operation, the application program (App) generates a take picture command. The take picture command comprises various parameters, for example, various parameters applicable to conventional general digital photography, such as shutter level, diaphragm level, flash default level (on/off/automatic), image contrast level, saturation level, and sharpness level. Furthermore, if it is necessary to display an obtained image on the user information device 20 after the photographic operation is finished, the application program (App) will generate a retrieve photo command.

At block 502, the resource agent program (Agt) of the user information device 20 receives commands (such as the aforementioned take picture command and retrieve photo command) generated by the aforementioned "virtual photography" application program (App) and determines that the user information device 20 does not have direct access to corresponding resources, or further determines that it is feasible for the appliance 10 to utilize shared resources provided by an assisting device (that is, the assisting device 30 or 40) and sends to the appliance 10 a command generated by the "virtual photography" application program (App) by means of a message.

Figure 5B:
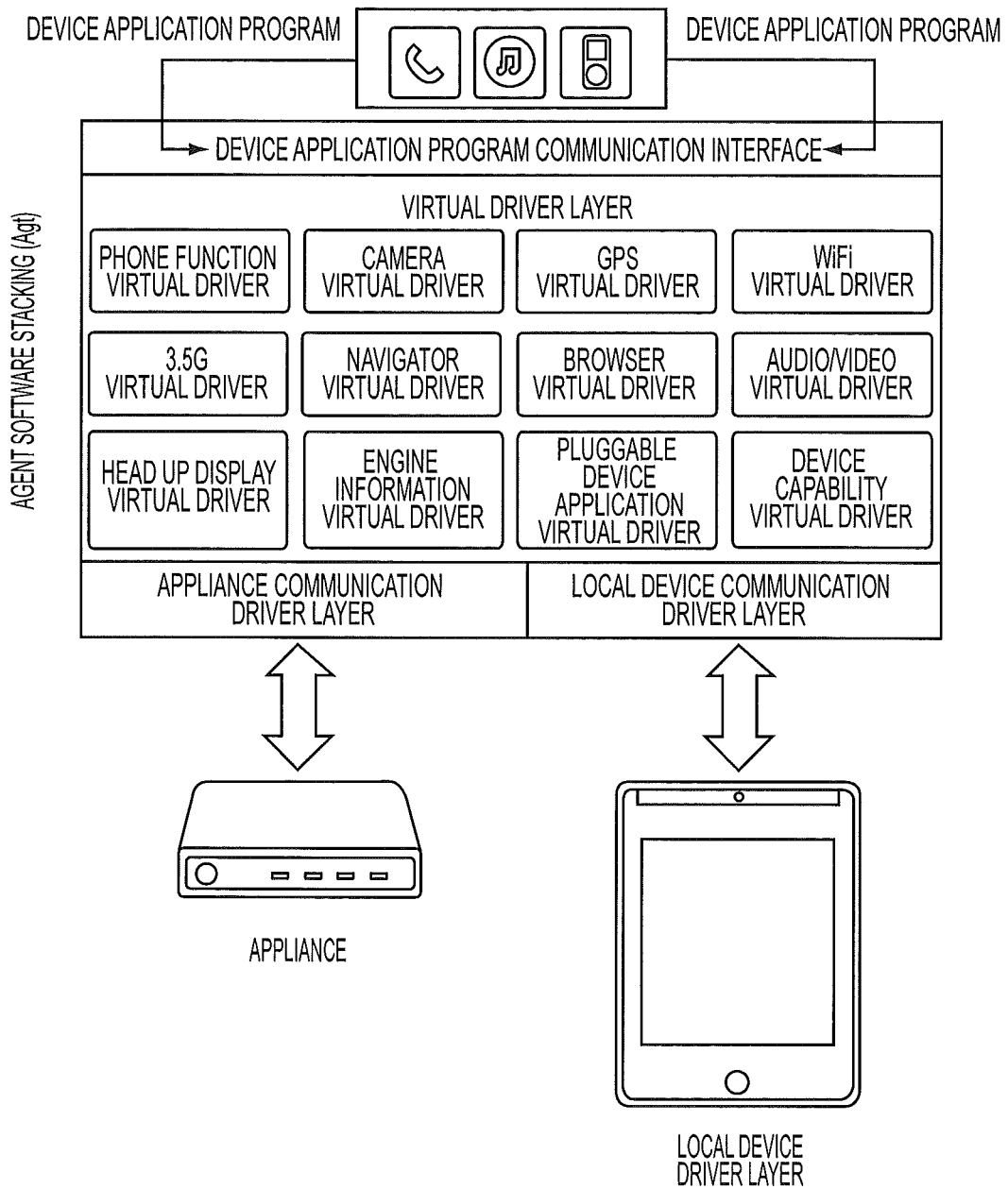
FIG. 5B is a diagram depicting a resource agent program in accordance with an embodiment.

FIG. 5B illustrates a resource agent program (Agt) implemented by software stacking (multiple virtual drivers) in an embodiment. With respect to resources required for an application program (App), if the resource agent program (Agt) determines that the user information device 20 is in possession of usable resources (that is, not in need of the shared resources provided by the assisting device 30 or 40), the resource agent program (Agt) may call a corresponding driver at the local end. If the resource agent program (Agt) determines that the user information device 20 is in lack of usable resources (that is, in need of the shared resources provided by the assisting device 30 or 40), the resource agent program (Agt) may call a corresponding virtual driver and communicate with the appliance 10.

Presented below is an example of a message (in XML format) sent from the resource agent program (Agt) of the user information device 20 to the appliance 10. The message in <APP> tag serves to identify the application program (App), whereas the message in <Action> tag describes commands, required resources ID and names, and related parameters.

```
<?xml version="1.0"?>
< AppAction xmlns="http://www.java2s.com"
    xmlns:xsi="http://www.w3.org/2001/XMLSchema-instance"
    xsi:schemaLocation="http://www.java2s.com Schema.xsd">
    <APP>
        <name>virtual photography</name>
    </APP >
    <Actions>
        <Action>
            <channel_id>001</channel_id>
            <name>photography</name>
            <action>take picture</action>
            <flash>auto</flash>
            <contrast>5</contrast>
            <saturation>6</saturation>
            <sharpness>18</sharpness>
        </Action>
        < Action>
            <channel_id>001</channel_id>
            <name>photography</name>
            <action>retrieve photo</action>
        </Action>
    </Actions>
</AppAction>
```

At block 504, after receiving from the user information device 20 a message that contains a command, the appliance 10 searches the registry shown in the Table 1 above according to the resources ID and names required for the command carried by the message, so as to determine whether any assisting device can provide the required resources. In this embodiment, the take picture command and the retrieve photo command need "photographic resources" (as shown in tags <channel_id> and <name> in tag <Action>), wherein the router module 16 of the appliance 10 determines, by random, whether the assisting device 30 (or the assisting device 40) has access to any shared "photographic resources," and then sends to the assisting device 30 (or the assisting device 40) by means of a message a command generated by "virtual photography" application program (App).

An example of a message (in XML format) sent from the appliance 10 to the assisting device 30 is as follows:

```
<?xml version="1.0"?>
< ChannelRequest xmlns="http://www.java2s.com"
    xmlns:xsi="http://www.w3.org/2001/XMLSchema-instance"
    xsi:schemaLocation="http://www.java2s.com Schema.xsd">
    <From>
        <name>virtual photography</name>
    </ From >
    <Actions>
        <Action>
            <channel_id>001</channel_id>
            <name>photography</name>
            <action>take picture</action>
            <flash>auto</flash>
            <contrast>5</contrast>
            <saturation>6</saturation>
            <sharpness>18</sharpness>
        </Action>
        < Action>
            <channel_id>001</channel_id>
            <name>photography</name>
            <action>>send photo to channel</action>
        </Action>
        ...
    </Actions>
</ChannelRequest>
```

However, in another embodiment, if the router module 16 determines that both the assisting device 30 and the assisting device 40 have access to available shared "photographic resources," the router module 16 determines which of the assisting device 30 or the assisting device 40 to use according to a preset rule. For example, by the preset rule, two photographic resources are compared in terms of a characteristic (such as the quantity of pixels) with a registration message shown in FIG. 3, such that the photographic resource having the greater number of pixels is selected.

At block 506, after receiving from the appliance 10 a message carrying a command, the assisting device 30 performs a photographic operation with its own "photographic resources" according to the take picture command and obtains a digital image, and sends the digital image back to the appliance 10 according to the retrieve photo command. The assisting device 30 may alternatively generate a report message to be sent to the appliance 10 together with the digital image.

An example of a message (in XML format) sent from the assisting device 30 to the appliance 10 is shown below. The message in tag <TargetApp> serves to identify an application program (App) to be responded to, whereas the message in tag <Channel> describes information related to an operation result (i.e., a digital image captured).

```
<?xml version="1.0"?>
<ChannelResponse xmlns="http://www.java2s.com"
    xmlns:xsi="http://www.w3.org/2001/XMLSchema-instance"
    xsi:schemaLocation="http://www.java2s.com Schema.xsd">
    <TargetApp>
        <name>virtual photography</name>
    </TargetApp >
    <Channels>
        <Channel>
            <channel_id>001</channel_id>
            <name>photography</name>
```

```
        <photo size>1024x768<photo size>
        <timestamp>1303118439</timestamp>
        <format>jpeg</format>
        <BASE64>X91Q4Qf6hj0IX5dYroowsiJkVAT...<BASE64>
    </Channel >
 </Channels>
</ChannelResponse>
```

At block 508, after receiving a report message and a digital image from the assisting device 30, the appliance 10 sends the digital image to the user information device 20 for display of the digital image. Selectively, the aforementioned report message may also be sent to the user information device 20.

Figure 6:
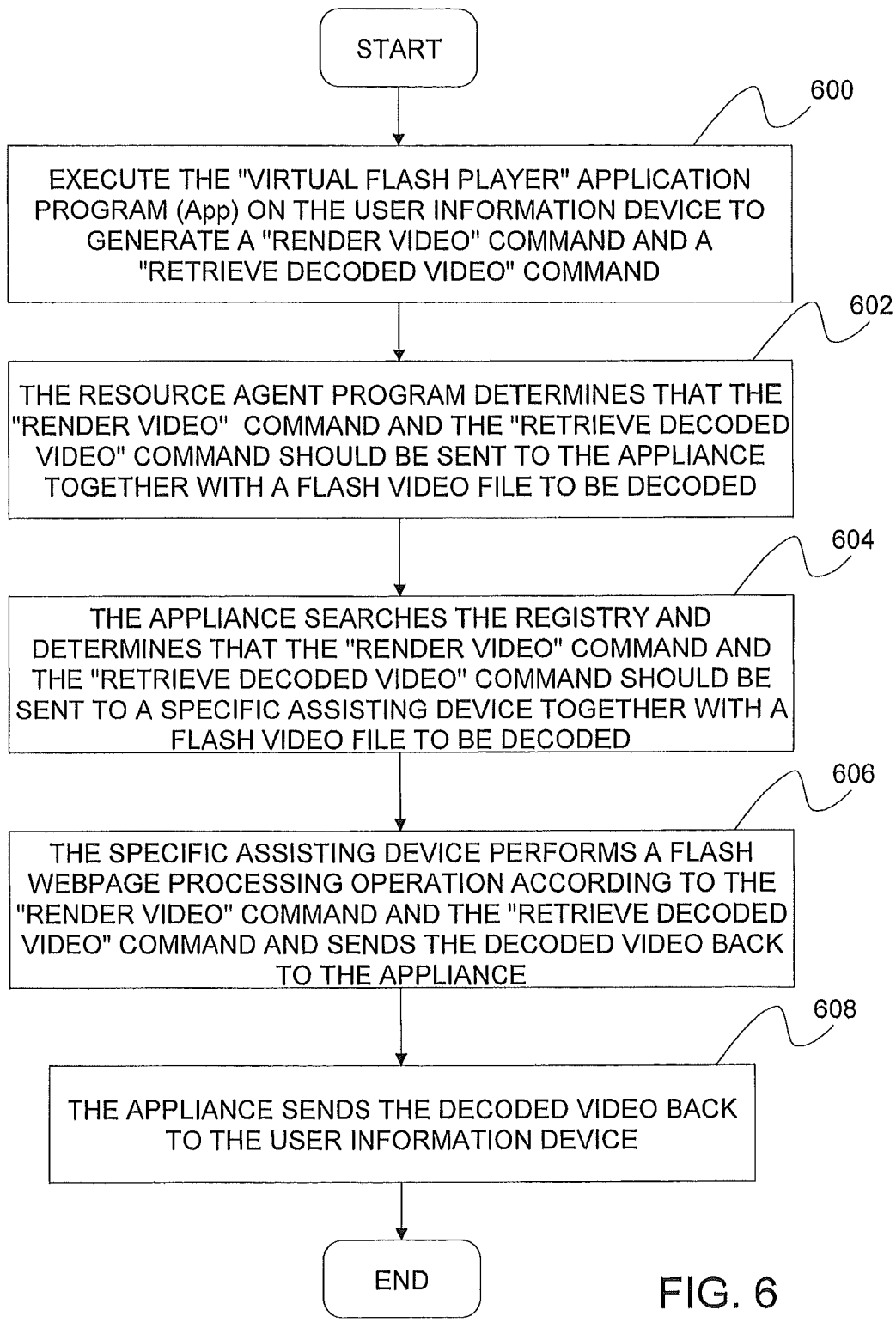

FIG. 6 is a flow chart of an embodiment in which the user information device 20 uses processing Flash webpage related resources of the assisting device 40.

At block 600, the user executes the "virtual Flash player" application program (App) installed beforehand on the user information device 20 to perform a Flash webpage processing operation, and the application program (App) generates a render video command in response to the Flash webpage processing, wherein the render video command includes various parameters, such as those applicable to conventional general processing Flash webpage, e.g., an encoding value. If it is necessary to display the obtained video on the user information device 20 after the Flash webpage processing operation is finished, the application program (App) may generate a retrieve decoded video command.

It will be understood that, although the "virtual Flash player" application program (App) in the embodiment illustrated with FIG. 6 and the "virtual photography" application program (App) in the embodiment illustrated with FIG. 5 are independent of each other, they may be integrated to form a single application program for generating various commands required for different operations.

At block 602, the resource agent program (Agt) of the user information device 20 receives commands (such as the aforementioned render video command and retrieve decoded video command) generated by the "virtual Flash player" application program (App) and determines that the user information device 20 does not have direct access to corresponding resources, or further determines that it is feasible for the appliance 10 to utilize shared resources provided by an assisting device (that is, the assisting device 40) and sends to the appliance 10 by means of a message a command generated by the "virtual Flash player" application program (App) together with a Flash video file to be decoded.

Presented below is an example of a message (in XML format) sent from the resource agent program (Agt) of the user information device 20 to the appliance 10. The message in tag <APP> serves to identify the application program (App), whereas the message in tag <Action> describes commands, required resources ID and names, and related parameters.

```
<?xml version="1.0"?>
< AppAction xmlns="http://www.java2s.com"
    xmlns:xsi="http://www.w3.org/2001/XMLSchema-instance"
    xsi:schemaLocation="http://www.java2s.com Schema.xsd">
    <APP>
        <name>virtual Flash player</name>
    </APP >
    <Actions>
        <Action>
            <channel_id>003</channel_id>
            <name>processing Flash webpage</name>
            <action>render video</action>
            <Base64>c2RmYXNkZmF.... <Base64>
        </Action>
        < Action>
            <channel_id>003</channel_id>
            <name>processing Flash webpage</name>
            <action>retrieve decoded video</action>
        </Action>
    </Actions>
</AppAction>
```

At block 604, after receiving from the user information device 20 a message that contains a command, the appliance 10 searches the registry shown in the above-referenced Table 1 according to the resources ID and names required for the command carried by the message, in order to determine whether any assisting device can provide the required resources. In this embodiment, the take picture command and the retrieve photo command need "processing Flash webpage related resources" (as shown in tags <channel_id> and <name> in tag <Action>), whereby the appliance 10 determines any shared "processing Flash webpage related resources" available to the assisting device 40 and then sends to the assisting device 40 by means of a message a command generated from "virtual Flash player" application program (App) together with a Flash video file to be decoded.

An example of a message (in XML format) sent from the appliance 10 to the assisting device 40 is presented below.

```
<?xml version="1.0"?>
< ChannelRequest xmlns="http://www.java2s.com"
    xmlns:xsi="http://www.w3.org/2001/XMLSchema-instance"
    xsi:schemaLocation="http://www.java2s.com Schema.xsd">
    <From>
        <name>virtual Flash player</name>
    </ From >
    <Actions>
        <Action>
            <channel_id>003</channel_id>
            <name>processing Flash webpage</name>
            <action>render video</action>
            <Base64>c2RmYXNkZmF.... <Base64>
        </Action>
        < Action>
            <channel_id>003</channel_id>
            <name>processing Flash webpage</name>
            <action>>send rendered content back to
            channel</action>
        </Action>
        ...
    </Actions>
</ChannelRequest>
```

At block 606, after receiving from the appliance 10 a message carrying a command and a Flash video file to be decoded, the assisting device 40 performs the Flash webpage processing operation according to the render video command with its own "processing Flash webpage related resources" to thereby decode the Flash video and obtain a decoded video, and sends the decoded video back to the appliance 10 according to the retrieve decoded video command. The assisting device 40 may alternatively generate a report message and send the report message and the decoded video back to the appliance 10.

Presented below is an example of a message (in XML format) sent from the assisting device 40 to the appliance 10.

The message in tag <TargetApp> serves to identify an application program (App) to be responded to, whereas the message in tag <Channel> describes information related to an operation result (i.e., decoded video).

```
<?xml version="1.0"?>
<ChannelResponse xmlns="http://www.java2s.com"
    xmlns:xsi="http://www.w3.org/2001/XMLSchema-instance"
    xsi:schemaLocation="http://www.java2s.com Schema.xsd">
    <TargetApp>
        <name>virtual Flash player</name>
    </TargetApp >
    <Channels>
        <Channel>
            <channel_id>003</channel_id>
            <name>processing Flash webpage</name>
            <content_size>1024kb</content_size>
            <format>avi</format>
            <Base64>c2RmYXNkZmF.... <Base64>
        </Channel >
    </Channels>
</ChannelResponse>
```

At block 608, after receiving the report message and the decoded video from the assisting device 40, the appliance 10 sends the decoded video to the user information device 20 to display the decoded video. Selectively, the aforementioned report message may also be sent to the user information device 20.

The foregoing embodiments are provided to illustrate and disclose the technical features therein, and are not intended to be restrictive of the scope of the embodiments. Hence, all equivalent variations or modifications made to the foregoing embodiments without departing from the spirit embodied in the disclosure should fall within the scope of the embodiments as set forth in the appended claims.

Reference throughout this specification to "one embodiment," "an embodiment," or similar language means that a particular feature, structure, or characteristic described herein is included in at least one embodiment. Thus, appearances of the phrases "in one embodiment," "in an embodiment," and similar language throughout this specification may, but do not necessarily, all refer to the same embodiment.

As will be appreciated by one skilled in the art, the embodiments may be embodied as an appliance, an information device, a method, or a computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of the embodiments described herein, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The embodiments are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

What is claimed is:

1. An appliance, comprising:
a communication interface configured to communicate with a user information device and a first assisting device, the first assisting device having access to a first resource capable of performing a first operation, the user information device communicatively coupled to the appliance over a short range wireless network;
a router module configured to receive a first command associated with the first operation from the user information device via the communication interface, the first command indicating a request for a resource that does not reside on the user information device; and
a registry comprising a plurality of items, wherein each item corresponds to an operation, each item records at least one entry of a resource that is capable of performing the item's corresponding operation, the registry is arranged by operation, the plurality of items comprises a first item corresponding to the first operation, and the first item records entry of the first assisting device in the registry;
wherein, in response to a determination that the first assisting device has access to the first resource, the router module sends the first command to the first assisting device, thereby enabling performance of the first operation using the first resource;
wherein the router module is further configured to receive from the first assisting device via the communication interface a first result yielded by the first operation performed with the first resource and sends the first result to the user information device; and
wherein the router receives a virtual application GUI corresponding to the first resource and sends the virtual application GUI to the user information device, the virtual application GUI selectable by a user of the communication interface to initiate the first operation.

2. The appliance of claim 1,
wherein the router module is further configured to send the first command to the first assisting device according to the first item.

3. The appliance of claim 2, wherein the first item is registered by the first assisting device.

4. The appliance of claim 2, wherein the router module is further configured to send the first command to the first resource according to a preset rule.

5. The appliance of claim 1, wherein the communication interface is configured to communicate with a second assisting device having access to a second resource that is configured to perform a second operation, wherein the router module receives a second command associated with the second operation from the user information device via the communication interface, wherein the router module determines that the second assisting device has access to the second resource in response to the second command and sends the second command to the second assisting device, thereby enabling performance of the second operation using the second resource.

6. The appliance of claim 5, wherein the router module receives from the second assisting device via the communication interface a second result yielded by the second operation performed with the second resource and sends the second result to the user information device.

7. A user information device for communicating with an appliance, the appliance further communicating with at least a first assisting device, wherein the first assisting device has access to a first resource capable of performing a first operation, the user information device comprising:
a device communication interface;
a processor configured to execute at least one application, the at least one application configured to generate a first command associated with the first operation via the processor, the first command indicating a request for a resource that does not reside on the user information device; and
a resource agent program executable by the processor, the resource agent program configured to send the first command to the appliance via the device communication interface and over a short range wireless network, the first command operable for enabling performance of the first operation using the first resource when the appliance sends the first command to the first assisting device, wherein the resource agent program is configured to determine that the user information device does not have access to the first resource, and the resource agent program is configured to send the first command to the appliance in respond to the determination that the user information device does not have access to the first resource;
wherein the user information device receives, from the appliance, a first result yielded by the first operation performed with the first resource, the first result sent to the appliance from the first assisting device, wherein the resource agent program receives the first result via the device communication interface and provides the first result for use by the at least one application program;
wherein the user information device receives a virtual application GUI corresponding to the first resource, the virtual application GUI selectable by a user of the device communication interface to initiate the first operation.

8. The user information device of claim 7, wherein the processor executes the at least one application to generate a second command associated with a second operation that is executable by a second resource, the second resource accessible by a second assisting device, wherein the resource agent program sends the second command to the appliance via the device communication interface, such that the appliance sends the second command to the second assisting device, thereby enabling performance of the second operation using the second resource.

9. The user information device of claim 8, wherein the user information device receives from the appliance a first result yielded by the first operation performed with the first resource and a second result yielded by the second operation performed with the second resource, the first result and the second result received by the appliance from the first assisting device and the second assisting device, respectively, wherein the resource agent program receives the first result and the second result via the device communication interface and provides the first result and the second result for use by the at least one application program.

10. The user information device of claim 8, further comprising a user interface configured to provide at least a first use mode and a second use mode, wherein, in the first use mode, the user interface prompts a user to perform the first operation with the user information device, wherein, in the second use mode, the user interface prompts the user to perform the first operation and the second operation with the user information device.

11. The user information device of claim 10, wherein the user interface further enables the user to configure operations prompted by the user interface to the user in the first use mode and the second use mode.

12. The user information device of claim 8, wherein the first command and the second command are generated by executing the same application program.

13. A method, comprising:
receiving, by a router module implemented by an appliance, a first command associated with a first operation, the first command received from a user information device over a short range wireless network, the first command indicating a request for a first resource that does not reside on the user information device;
in response to determining that a first assisting device has access to the first resource that is capable of performing the first operation, sending the first command to the first assisting device, thereby enabling performance of the first operation using the first resource;
receiving, by the router module from the first assisting device, a first result yielded by the first operation performed with the first resource; and
sending the first result to the user information device;
wherein the router module receives a virtual application GUI corresponding to the first resource and sends the virtual application GUI to the user information device, the virtual application GUI selectable by a user of the communication interface to initiate the first operation; and
wherein the appliance includes a registry, the registry comprising a plurality of items, each item corresponds to an operation, each item records at least one entry of a resource that is capable of performing the item's corresponding operation, the registry is arranged by operation, the plurality of items comprises a first item corresponding to the first operation, and the first item records entry of the first assisting device in the registry.

14. The method of claim 13, wherein the method further comprises:
sending the first command to the first assisting device according to the first item.

15. The method of claim 14, wherein the first item is registered by the first assisting device.

16. A computer program product comprising:
a non-transitory computer readable storage medium having computer readable program code embodied therewith, the computer readable program code causing a computer processor of an appliance to perform a method, comprising:
receiving, at the appliance, a first command associated with a first operation, the first command received from a user information device over a short range wireless network, the first command indicating a request for a first resource that does not reside on the user information device;
in response to determining that a first assisting device has access to the first resource that is capable of performing the first operation, sending the first command to the first assisting device, such that the first operation is performed using the first resource;
receiving a first result yielded by the first operation performed with the first resource; and
sending the first result to the user information device;
wherein the router receives a virtual application GUI corresponding to the first resource and sends the virtual application GUI to the user information device, the virtual application GUI selectable by a user of the communication interface to initiate the first operation; and
wherein the appliance includes a registry, the registry comprising a plurality of items, each item correspond to an operation, each item records at least one entry of a resource that is capable of performing the item's corresponding operation, the registry is arranged by operation, the plurality of items comprises a first item corresponding to the first operation, and the first item records entry of the first assisting device in the registry.

17. The computer program product of claim 16, wherein the computer readable program code is further configured to perform:
sending the first command to the first assisting device according to the first item.

18. The computer program product of claim 17, wherein the first item is registered by the first assisting device.

19. The appliance of claim 1, wherein in response to determining that the first assisting device and a second assisting device have the first resource, the appliance selects the first assisting device to send the first command based on a preset rule and as a function of distinguishing characteristics between the resource of the first assisting device and the resource of the second assisting device.

20. The appliance of claim 1, wherein the first resource is a photography application, the first command is a take photo command, and the first result yielded by the first operation is an image taken via the photography application of the first assisting device.

* * * * *